US012632336B2

(12) United States Patent
Gray et al.

(10) Patent No.: US 12,632,336 B2
(45) Date of Patent: May 19, 2026

(54) METADATA BASED LISTING IN A DISTRIBUTED STORAGE SYSTEM

(71) Applicant: Pure Storage, Inc., Mountain View, CA (US)

(72) Inventors: Adam M. Gray, Chicago, IL (US); Greg R. Dhuse, Chicago, IL (US); Andrew D. Baptist, Mt. Pleasant, WI (US); Ravi V. Khadiwala, Bartlett, IL (US); Wesley B. Leggette, Chicago, IL (US); Scott M. Horan, Clarendon Hills, IL (US); Franco V. Borich, Naperville, IL (US); Bart R. Cilfone, Marina del Rey, CA (US); Daniel J. Scholl, Chicago, IL (US)

(73) Assignee: Pure Storage, Inc., Santa Clara, CA (US)

( * ) Notice: Subject to any disclaimer, the term of this patent is extended or adjusted under 35 U.S.C. 154(b) by 265 days.

(21) Appl. No.: 17/454,125

(22) Filed: Nov. 9, 2021

(65) Prior Publication Data

US 2022/0066879 A1 Mar. 3, 2022

Related U.S. Application Data

(63) Continuation of application No. 15/837,868, filed on Dec. 11, 2017, which is a continuation-in-part of
(Continued)

(51) Int. Cl.
G06F 12/08 (2016.01)
G06F 3/06 (2006.01)
(Continued)

(52) U.S. Cl.
CPC ........ *G06F 11/1076* (2013.01); *G06F 3/0604* (2013.01); *G06F 3/0607* (2013.01);
(Continued)

(58) Field of Classification Search
CPC .... G06F 3/0611; G06F 3/0631; G06F 3/0644; G06F 3/0652
(Continued)

(56) References Cited

U.S. PATENT DOCUMENTS

| | | |
|---|---|---|
| 4,092,732 A | 5/1978 | Ouchi |
| 5,454,101 A | 9/1995 | Mackay |

(Continued)

OTHER PUBLICATIONS

Chung; An Automatic Data Segmentation Method for 3D Measured Data Points; National Taiwan University, pp. 1-8; 1998.
(Continued)

*Primary Examiner* — Mohamed M Gebril
(74) *Attorney, Agent, or Firm* — Katz Ruby & Carle LLP; Kelly H. Hale; Bruce E. Stuckman

(57) ABSTRACT

A method for execution by storage network begins by identifying a subset of encoded data slices stored in a set of storage units for enhanced access and interpreting registry data to determine a listing type. The method continues by generating listing slice names for the subset of encoded data slices based on the listing type and sending the listing slice names to the set of storage units, where each storage unit updating storage and/or listing of at least some of the subset of encoded data slices associated with the storage unit based on the listing type and each storage unit issuing slice access information to a requesting entity in response to one or more slice access requests in accordance with the listing type for some of the subset of encoded data slices and the requesting entity receiving slice access information from at least some of the set of storage units.

20 Claims, 6 Drawing Sheets

Related U.S. Application Data application No. 14/926,891, filed on Oct. 29, 2015, now Pat. No. 10,126,974.

(60) Provisional application No. 62/098,414, filed on Dec. 31, 2014.

(51) Int. Cl.
  G06F 11/10     (2006.01)
  G06F 12/0808    (2016.01)
  G06F 12/0815    (2016.01)

(52) U.S. Cl.
  CPC ............ G06F 3/0619 (2013.01); G06F 3/064 (2013.01); G06F 3/0644 (2013.01); G06F 3/0647 (2013.01); G06F 3/067 (2013.01)

(58) Field of Classification Search
  USPC ........................................................ 711/172
  See application file for complete search history.

(56) References Cited

U.S. PATENT DOCUMENTS

| | | | | |
|---|---|---|---|---|
| 5,485,474 | A | 1/1996 | Rabin | |
| 5,774,643 | A | 6/1998 | Lubbers | |
| 5,802,364 | A | 9/1998 | Senator | |
| 5,809,285 | A | 9/1998 | Hilland | |
| 5,864,875 | A * | 1/1999 | Van Huben | G06F 30/00 |
| 5,890,156 | A | 3/1999 | Rekieta | |
| 5,987,622 | A | 11/1999 | Lo Verso | |
| 5,991,414 | A | 11/1999 | Garay | |
| 6,012,159 | A | 1/2000 | Fischer | |
| 6,058,454 | A | 5/2000 | Gerlach | |
| 6,128,277 | A | 10/2000 | Bruck | |
| 6,175,571 | B1 | 1/2001 | Haddock | |
| 6,192,472 | B1 | 2/2001 | Garay | |
| 6,256,688 | B1 | 7/2001 | Suetaka | |
| 6,272,658 | B1 | 8/2001 | Steele | |
| 6,301,604 | B1 | 10/2001 | Nojima | |
| 6,356,949 | B1 | 3/2002 | Katsandres | |
| 6,366,995 | B1 | 4/2002 | Vilkov | |
| 6,374,336 | B1 | 4/2002 | Peters | |
| 6,377,500 | B1 * | 4/2002 | Fujimoto | G06F 12/0246 365/230.01 |
| 6,415,373 | B1 | 7/2002 | Peters | |
| 6,418,539 | B1 | 7/2002 | Walker | |
| 6,449,688 | B1 | 9/2002 | Peters | |
| 6,567,948 | B2 | 5/2003 | Steele | |
| 6,571,282 | B1 | 5/2003 | Bowman-Amuah | |
| 6,609,223 | B1 | 8/2003 | Wolfgang | |
| 6,718,361 | B1 | 4/2004 | Basani | |
| 6,760,808 | B2 | 7/2004 | Peters | |
| 6,785,768 | B2 | 8/2004 | Peters | |
| 6,785,783 | B2 | 8/2004 | Buckland | |
| 6,826,711 | B2 | 11/2004 | Moulton | |
| 6,879,596 | B1 | 4/2005 | Dooply | |
| 7,003,688 | B1 | 2/2006 | Pittelkow | |
| 7,024,451 | B2 | 4/2006 | Jorgenson | |
| 7,024,609 | B2 | 4/2006 | Wolfgang | |
| 7,080,101 | B1 | 7/2006 | Watson | |
| 7,103,824 | B2 | 9/2006 | Halford | |
| 7,103,915 | B2 | 9/2006 | Redlich | |
| 7,111,115 | B2 | 9/2006 | Peters | |
| 7,140,044 | B2 | 11/2006 | Redlich | |
| 7,146,644 | B2 | 12/2006 | Redlich | |
| 7,171,493 | B2 | 1/2007 | Shu | |
| 7,222,133 | B1 | 5/2007 | Raipurkar | |
| 7,240,236 | B2 | 7/2007 | Cutts | |
| 7,272,613 | B2 | 9/2007 | Sim | |
| 7,552,148 | B2 * | 6/2009 | Liu | G06F 11/1435 714/24 |
| 7,636,724 | B2 | 12/2009 | de la Torre | |
| 8,458,127 | B1 * | 6/2013 | Lorch, III | G06F 11/1456 707/661 |
| 8,595,435 | B2 * | 11/2013 | Cilfone | G06F 3/0607 711/170 |
| 8,667,273 | B1 * | 3/2014 | Billstrom | G06F 21/6209 713/165 |
| 8,880,801 | B1 * | 11/2014 | Robins | G06F 11/1092 711/170 |
| 9,081,829 | B2 * | 7/2015 | Bhave | H04L 43/04 |
| 9,292,520 | B1 * | 3/2016 | Madiraju Varadaraju | G06F 11/1451 |
| 9,462,316 | B2 * | 10/2016 | Gladwin | H04N 21/232 |
| 9,571,570 | B1 * | 2/2017 | Mutnuru | G06F 11/3433 |
| 9,621,427 | B1 * | 4/2017 | Shah | H04L 41/0895 |
| 9,774,684 | B2 * | 9/2017 | Dhuse | H04L 67/1097 |
| 9,846,540 | B1 * | 12/2017 | Franklin | G06F 3/0616 |
| 9,858,006 | B1 * | 1/2018 | Wu | G06F 3/0604 |
| 10,216,757 | B1 * | 2/2019 | Armangau | G06F 16/178 |
| 2002/0062422 | A1 | 5/2002 | Butterworth | |
| 2002/0166079 | A1 | 11/2002 | Ulrich | |
| 2003/0018927 | A1 | 1/2003 | Gadir | |
| 2003/0037261 | A1 | 2/2003 | Meffert | |
| 2003/0065617 | A1 | 4/2003 | Watkins | |
| 2003/0084020 | A1 | 5/2003 | Shu | |
| 2003/0126387 | A1 * | 7/2003 | Watanabe | G06F 11/2058 711/161 |
| 2004/0024963 | A1 | 2/2004 | Talagala | |
| 2004/0098545 | A1 * | 5/2004 | Pline | G06F 13/1684 711/115 |
| 2004/0122917 | A1 | 6/2004 | Menon | |
| 2004/0177100 | A1 * | 9/2004 | Bjorner | G06F 12/0253 |
| 2004/0215998 | A1 | 10/2004 | Buxton | |
| 2004/0228493 | A1 | 11/2004 | Ma | |
| 2005/0100022 | A1 | 5/2005 | Ramprashad | |
| 2005/0114594 | A1 | 5/2005 | Corbett | |
| 2005/0125593 | A1 | 6/2005 | Karpoff | |
| 2005/0131993 | A1 | 6/2005 | Fatula, Jr. | |
| 2005/0132070 | A1 | 6/2005 | Redlich | |
| 2005/0144382 | A1 | 6/2005 | Schmisseur | |
| 2005/0229069 | A1 | 10/2005 | Hassner | |
| 2005/0283649 | A1 * | 12/2005 | Turner | H04L 67/1095 714/6.12 |
| 2006/0047907 | A1 | 3/2006 | Shiga | |
| 2006/0107010 | A1 * | 5/2006 | Hirezaki | G06F 3/0647 711/165 |
| 2006/0136448 | A1 | 6/2006 | Cialini | |
| 2006/0156059 | A1 | 7/2006 | Kitamura | |
| 2006/0224603 | A1 | 10/2006 | Correll | |
| 2007/0006322 | A1 * | 1/2007 | Karimzadeh | G06F 21/6227 726/28 |
| 2007/0078901 | A1 * | 4/2007 | Satou | G06F 3/0605 |
| 2007/0079081 | A1 | 4/2007 | Gladwin | |
| 2007/0079082 | A1 | 4/2007 | Gladwin | |
| 2007/0079083 | A1 | 4/2007 | Gladwin | |
| 2007/0088970 | A1 | 4/2007 | Buxton | |
| 2007/0174192 | A1 | 7/2007 | Gladwin | |
| 2007/0214285 | A1 | 9/2007 | Au | |
| 2007/0234110 | A1 | 10/2007 | Soran | |
| 2007/0283167 | A1 | 12/2007 | Venters, III | |
| 2007/0299887 | A1 * | 12/2007 | Novik | G06F 16/273 707/999.203 |
| 2008/0320243 | A1 * | 12/2008 | Mitsuzuka | G06F 15/167 711/E12.016 |
| 2009/0094251 | A1 | 4/2009 | Gladwin | |
| 2009/0094318 | A1 | 4/2009 | Gladwin | |
| 2009/0217056 | A1 * | 8/2009 | Malpani | G06F 21/41 713/193 |
| 2010/0023524 | A1 | 1/2010 | Gladwin | |
| 2010/0094955 | A1 * | 4/2010 | Zuckerman | H04L 67/1097 709/219 |
| 2010/0153638 | A1 * | 6/2010 | Yochai | G06F 11/1464 711/E12.019 |
| 2010/0235321 | A1 * | 9/2010 | Shukla | G06F 16/9574 707/610 |
| 2011/0029711 | A1 * | 2/2011 | Dhuse | G06F 11/1076 711/170 |
| 2011/0029731 | A1 * | 2/2011 | Cilfone | G06F 11/1076 711/170 |
| 2011/0029809 | A1 * | 2/2011 | Dhuse | H04L 67/1097 714/6.1 |

(56)				References Cited

U.S. PATENT DOCUMENTS

| | | | | |
|---|---|---|---|---|
| 2011/0060974 A1* | 3/2011 | Viger | H04L 1/0009 | 714/E11.032 |
| 2011/0071988 A1* | 3/2011 | Resch | G06F 11/1443 | 707/E17.007 |
| 2011/0072210 A1* | 3/2011 | Dhuse | G06F 11/1076 | 711/114 |
| 2011/0072321 A1* | 3/2011 | Dhuse | G06F 11/1076 | 714/E11.023 |
| 2011/0078373 A1* | 3/2011 | Hoffman | G06F 16/1827 | 711/170 |
| 2011/0106904 A1* | 5/2011 | Resch | H04N 21/20 | 711/E12.002 |
| 2011/0125999 A1* | 5/2011 | Cilfone | G06F 11/1464 | 711/E12.001 |
| 2011/0161666 A1* | 6/2011 | Gladwin | H04L 67/06 | 711/E12.092 |
| 2011/0184997 A1* | 7/2011 | Grube | H04L 67/1097 | 707/827 |
| 2011/0185141 A1* | 7/2011 | Dhuse | G06F 3/067 | 711/E12.002 |
| 2011/0214011 A1* | 9/2011 | Grube | G06F 11/1092 | 714/E11.062 |
| 2011/0225362 A1* | 9/2011 | Leggette | G06F 3/0638 | 711/114 |
| 2011/0225386 A1* | 9/2011 | Motwani | G06F 16/113 | 711/170 |
| 2011/0225466 A1* | 9/2011 | Resch | G06F 11/1076 | 711/170 |
| 2011/0228931 A1* | 9/2011 | Grube | G06F 11/10 | 713/189 |
| 2011/0276744 A1* | 11/2011 | Sengupta | G06F 12/0246 | 711/216 |
| 2011/0289383 A1* | 11/2011 | Dhuse | H04L 9/0894 | 714/763 |
| 2011/0295796 A1* | 12/2011 | Muhunthan | G06F 16/27 | 707/610 |
| 2011/0296133 A1* | 12/2011 | Flynn | G06F 3/0652 | 711/171 |
| 2012/0005440 A1* | 1/2012 | Nakao | G06F 3/0607 | 711/E12.002 |
| 2012/0089809 A1* | 4/2012 | Resch | G06F 11/08 | 711/206 |
| 2012/0102316 A1* | 4/2012 | Resch | G06F 11/1076 | 713/150 |
| 2012/0117351 A1* | 5/2012 | Motwani | G06F 3/0647 | 711/E12.002 |
| 2012/0137091 A1* | 5/2012 | Grube | G06F 12/0638 | 711/158 |
| 2012/0163596 A1* | 6/2012 | Grube | G06F 3/067 | 380/252 |
| 2012/0166757 A1* | 6/2012 | Volvovski | G06F 3/067 | 711/206 |
| 2012/0179887 A1* | 7/2012 | Maruyama | G06F 3/061 | 711/E12.103 |
| 2012/0198197 A1* | 8/2012 | Gladwin | G06F 16/13 | 711/170 |
| 2012/0221611 A1* | 8/2012 | Watanabe | G06F 3/0671 | 707/827 |
| 2012/0278569 A1* | 11/2012 | Kawakami | G06F 3/0653 | 711/E12.103 |
| 2012/0311068 A1* | 12/2012 | Gladwin | H04L 65/00 | 709/214 |
| 2013/0173561 A1* | 7/2013 | Cherian | G06F 3/0608 | 707/E17.005 |
| 2013/0198130 A1* | 8/2013 | Resch | G06F 21/602 | 707/609 |
| 2013/0232307 A1* | 9/2013 | Clifone | G06F 11/1092 | 711/154 |
| 2013/0238900 A1* | 9/2013 | Leggette | G06F 9/5077 | 713/165 |
| 2013/0275545 A1* | 10/2013 | Baptist | H04L 67/10 | 709/215 |
| 2013/0275699 A1* | 10/2013 | Cheriton | G06F 12/0223 | 711/162 |
| 2013/0275744 A1* | 10/2013 | Resch | H04L 67/10 | 713/150 |
| 2013/0282953 A1* | 10/2013 | Orme | H04L 12/6418 | 711/102 |
| 2013/0304746 A1* | 11/2013 | Dhuse | G06F 11/1096 | 707/743 |
| 2013/0318313 A1* | 11/2013 | Clifford | G06F 11/1461 | 711/E12.103 |
| 2013/0326264 A1* | 12/2013 | Resch | G06F 11/1088 | 714/6.2 |
| 2013/0339316 A1* | 12/2013 | Hirsch | G06F 3/0641 | 707/E17.032 |
| 2013/0339420 A1* | 12/2013 | Srinivasan | H04L 69/329 | 709/201 |
| 2013/0346716 A1* | 12/2013 | Resch | G06F 3/065 | 711/162 |
| 2013/0346795 A1* | 12/2013 | Gladwin | G06F 3/0619 | 714/6.22 |
| 2014/0068259 A1* | 3/2014 | Resch | G06F 21/10 | 713/189 |
| 2014/0074786 A1* | 3/2014 | Leggette | G06F 16/278 | 707/638 |
| 2014/0195875 A1* | 7/2014 | Resch | G06F 11/1092 | 714/763 |
| 2014/0236913 A1* | 8/2014 | Chakradhar | G06F 16/2343 | 707/703 |
| 2014/0279912 A1* | 9/2014 | Anglin | G06F 11/1458 | 707/640 |
| 2014/0281804 A1* | 9/2014 | Resch | G06F 11/1096 | 714/763 |
| 2014/0281817 A1* | 9/2014 | Grube | H04L 41/5054 | 714/769 |
| 2014/0325157 A1* | 10/2014 | Sangapu | G06F 3/0689 | 711/126 |
| 2014/0330923 A1* | 11/2014 | Baptist | G06F 3/067 | 709/213 |
| 2014/0344227 A1* | 11/2014 | Grube | H04L 67/1097 | 707/812 |
| 2014/0344617 A1* | 11/2014 | Resch | G06F 11/1088 | 714/6.31 |
| 2014/0351457 A1* | 11/2014 | Baptist | G06F 3/0619 | 710/5 |
| 2015/0002522 A1* | 1/2015 | Nalluri | G06T 1/20 | 345/522 |
| 2015/0006780 A1* | 1/2015 | Shao | G06F 13/4027 | 710/316 |
| 2015/0113326 A1* | 4/2015 | Talagala | G06F 11/2094 | 714/24 |
| 2015/0347440 A1* | 12/2015 | Habouzit | G06F 16/1734 | 707/824 |
| 2016/0070652 A1* | 3/2016 | Sundararaman | G06F 3/0665 | 711/154 |
| 2016/0142249 A1* | 5/2016 | Wu | G06F 3/0683 | 709/222 |
| 2016/0170871 A1* | 6/2016 | Hyun | G06F 3/0653 | 711/103 |
| 2016/0188253 A1* | 6/2016 | Resch | G06F 3/0647 | 711/172 |
| 2016/0278014 A1* | 9/2016 | Chen | H04W 52/0235 | |
| 2017/0153942 A1* | 6/2017 | Cabral | G06F 11/1402 | |
| 2017/0353580 A1* | 12/2017 | Horan | G06F 9/5011 | |
| 2018/0107397 A1* | 4/2018 | Gray | G06F 3/067 | |
| 2018/0107431 A1* | 4/2018 | Resch | G06F 3/0619 | |
| 2018/0107545 A1* | 4/2018 | Gray | G06F 3/064 | |
| 2018/0373459 A1* | 12/2018 | Resch | G06F 3/0604 | |
| 2019/0310782 A1* | 10/2019 | Baptist | G06F 11/1076 | |
| 2020/0218471 A1* | 7/2020 | Chen | G06F 3/0659 | |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

(56) References Cited

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Technical Specification Road Map; IETF Network Working Group; RFC 4510; Jun. 2006; pp. 1-8.

* cited by examiner distributed, or dispersed, storage
network (DSN) 10

SN = slice name
EDS = encoded data slice

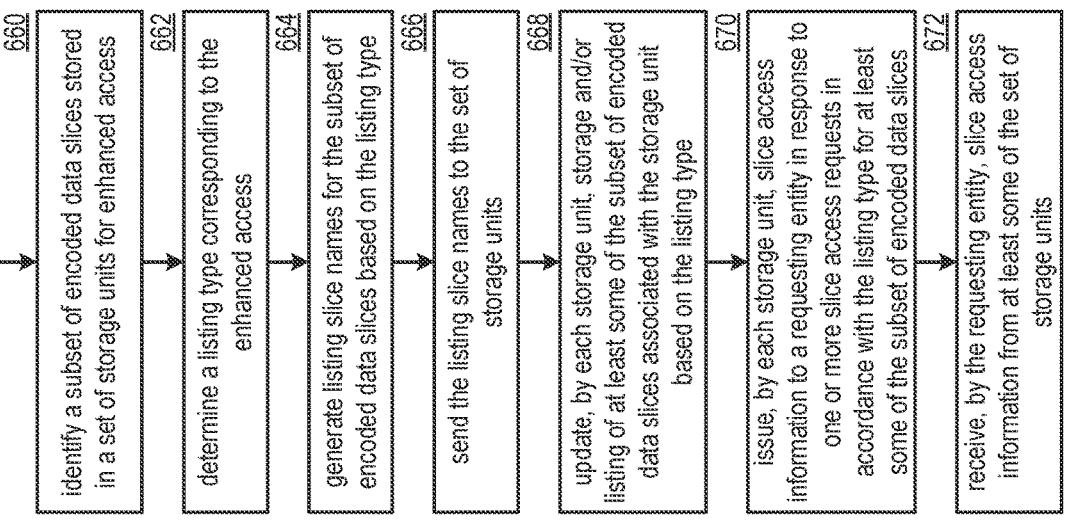

660 identify a subset of encoded data slices stored in a set of storage units for enhanced access

662 determine a listing type corresponding to the enhanced access

664 generate listing slice names for the subset of encoded data slices based on the listing type

666 send the listing slice names to the set of storage units

668 update, by each storage unit, storage and/or listing of at least some of the subset of encoded data slices associated with the storage unit based on the listing type

670 issue, by each storage unit, slice access information to a requesting entity in response to one or more slice access requests in accordance with the listing type for at least some of the subset of encoded data slices

672 receive, by the requesting entity, slice access information from at least some of the set of storage units

FIG. 9A

METADATA BASED LISTING IN A DISTRIBUTED STORAGE SYSTEM

CROSS-REFERENCE TO RELATED APPLICATIONS

The present U.S. Utility patent application claims priority pursuant to 35 U.S.C. § 120, as a continuation of U.S. Utility application Ser. No. 15/837,868, entitled "LISTING TYPES IN A DISTRIBUTED STORAGE SYSTEM", filed Dec. 11, 2017, which is a continuation-in-part (CIP) of U.S. Utility patent application Ser. No. 14/926,891, entitled "REDISTRIBUTING ENCODED DATA SLICES IN A DISPERSED STORAGE NETWORK," filed Oct. 29, 2015, issued as U.S. Pat. No. 10,126,974 on Nov. 13, 2018, which claims priority pursuant to 35 U.S.C. § 119(e) to U.S. Provisional Application No. 62/098,414, entitled "SYNCHRONIZING UTILIZATION OF A PLURALITY OF DISPERSED STORAGE RESOURCES," filed Dec. 31, 2014, all of which are hereby incorporated herein by reference in their entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 9A is a flowchart illustrating an example of establishing efficient access to stored encoded data slices in accordance with the present invention.

DETAILED DESCRIPTION OF THE INVENTION

Figure 1:
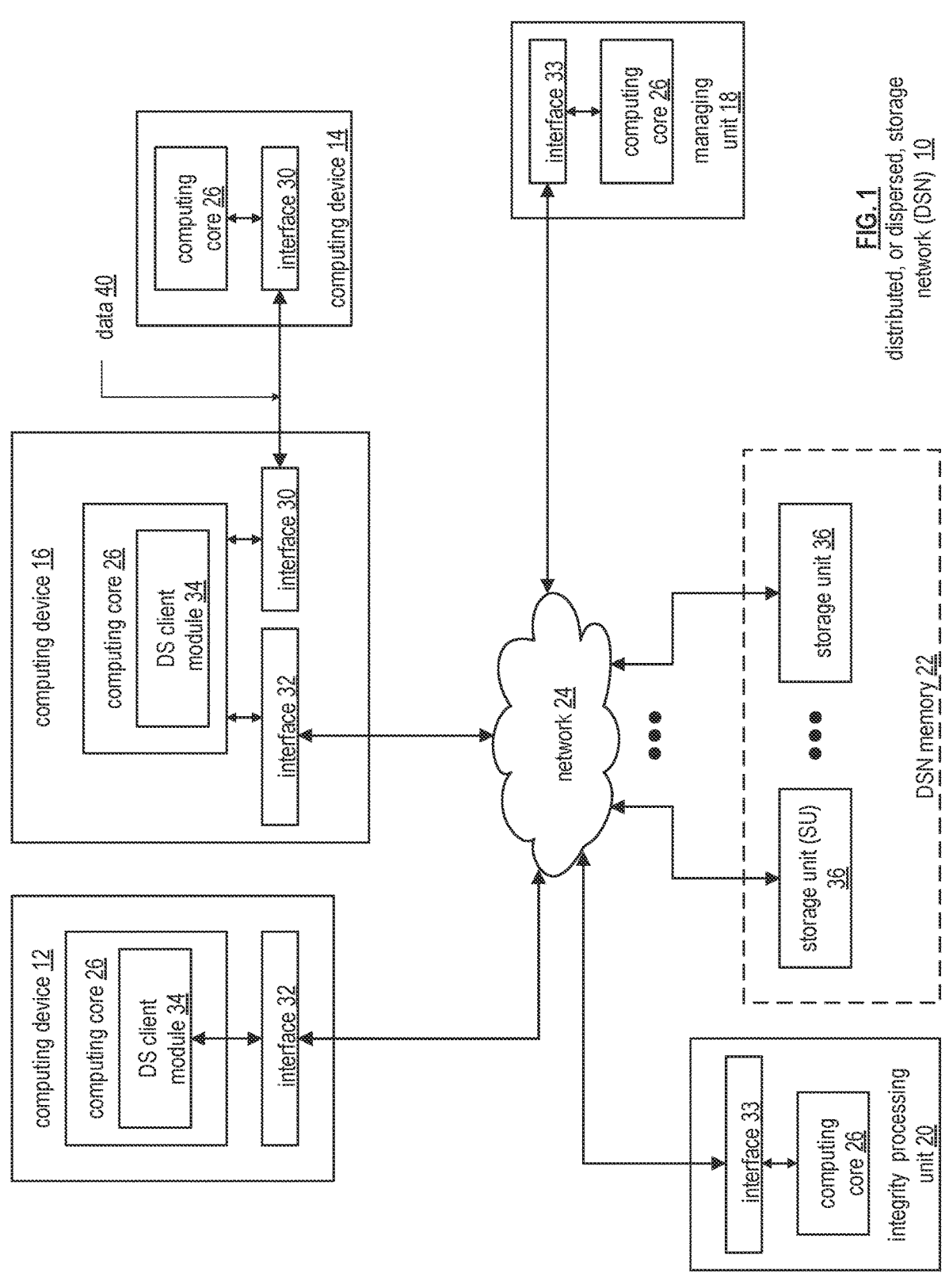
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
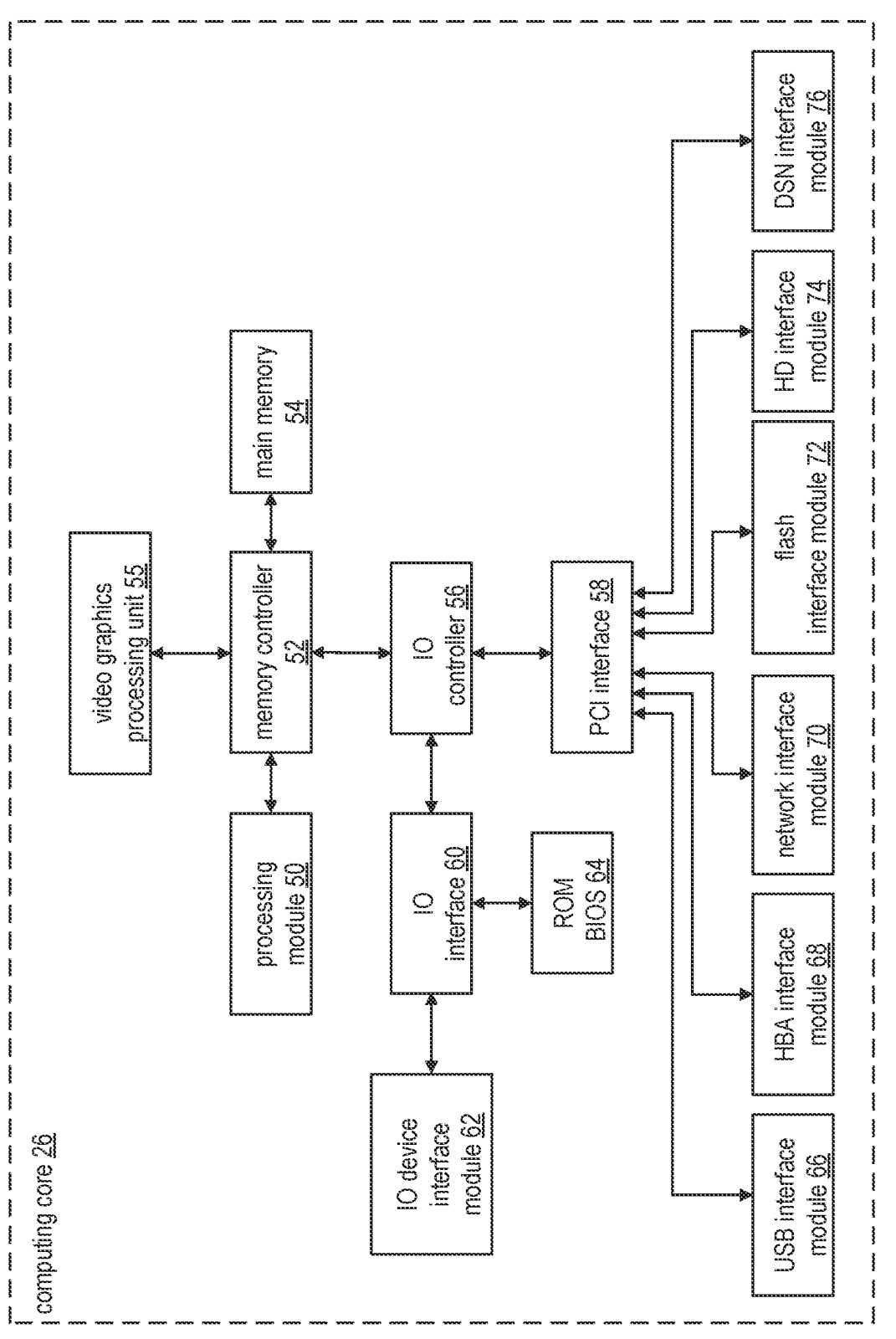
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a DS client module 34, which enables the computing device to dispersed storage error encode and decode data as subsequently described with reference to one or more of FIGS. 3-9A. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate per-access billing information. In another instance, the DSTN managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4, 5, 6:
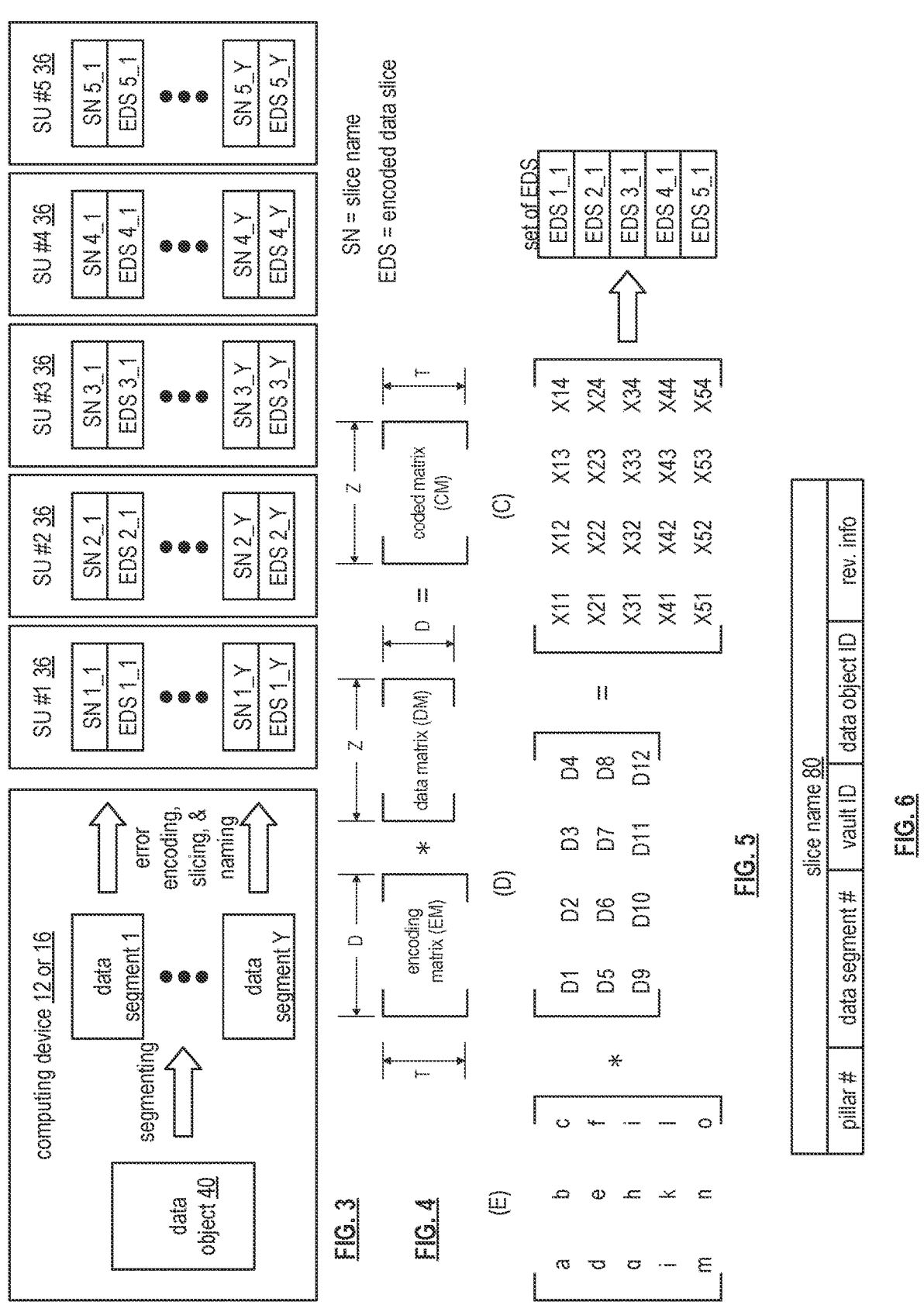
FIG. 3 is a schematic block diagram of an example of dispersed storage error encoding of data in accordance with the present invention.
FIG. 4 is a schematic block diagram of a generic example of an error encoding function in accordance with the present invention.
FIG. 5 is a schematic block diagram of a specific example of an error encoding function in accordance with the present invention.
FIG. 6 is a schematic block diagram of an example of a slice name of an encoded data slice (EDS) in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity check-sum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
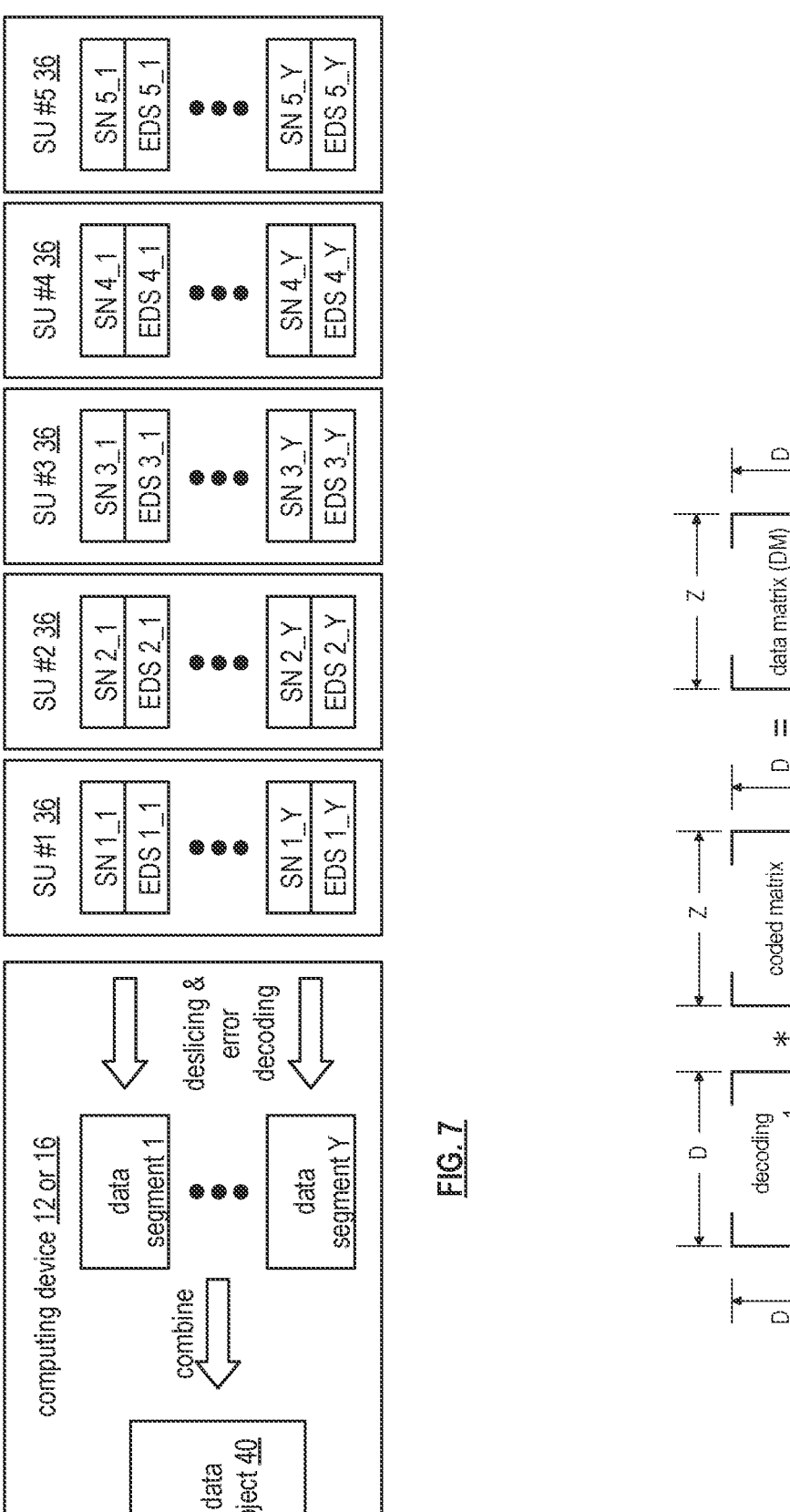
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In one embodiment, one field in the slice name (the storage type) is used as a hint to the distributed or dispersed storage (DS) unit for what type of data it is, to make more optimal storage decisions. However, the DS unit need not honor or use this and is free to store the slice in whatever manner suitable. A related field which may immediately follow the storage type in the slice name is the "Listing Type", this field (at least 8 bits long) enables a requester to signal the DS unit to put the slice into its own separate bin for efficient listing (or if it is already near-enough to a most-significant-bit, perhaps no more optimization is required), depending on the storage layer used by the DS unit. This requester-defined field in the slice name enables the requester to define different types of data that may be of interest to be efficiently enumerated via normal listing techniques, and enables rapid location and detection by other agents in the future that may be interested in it.

Figure 9:
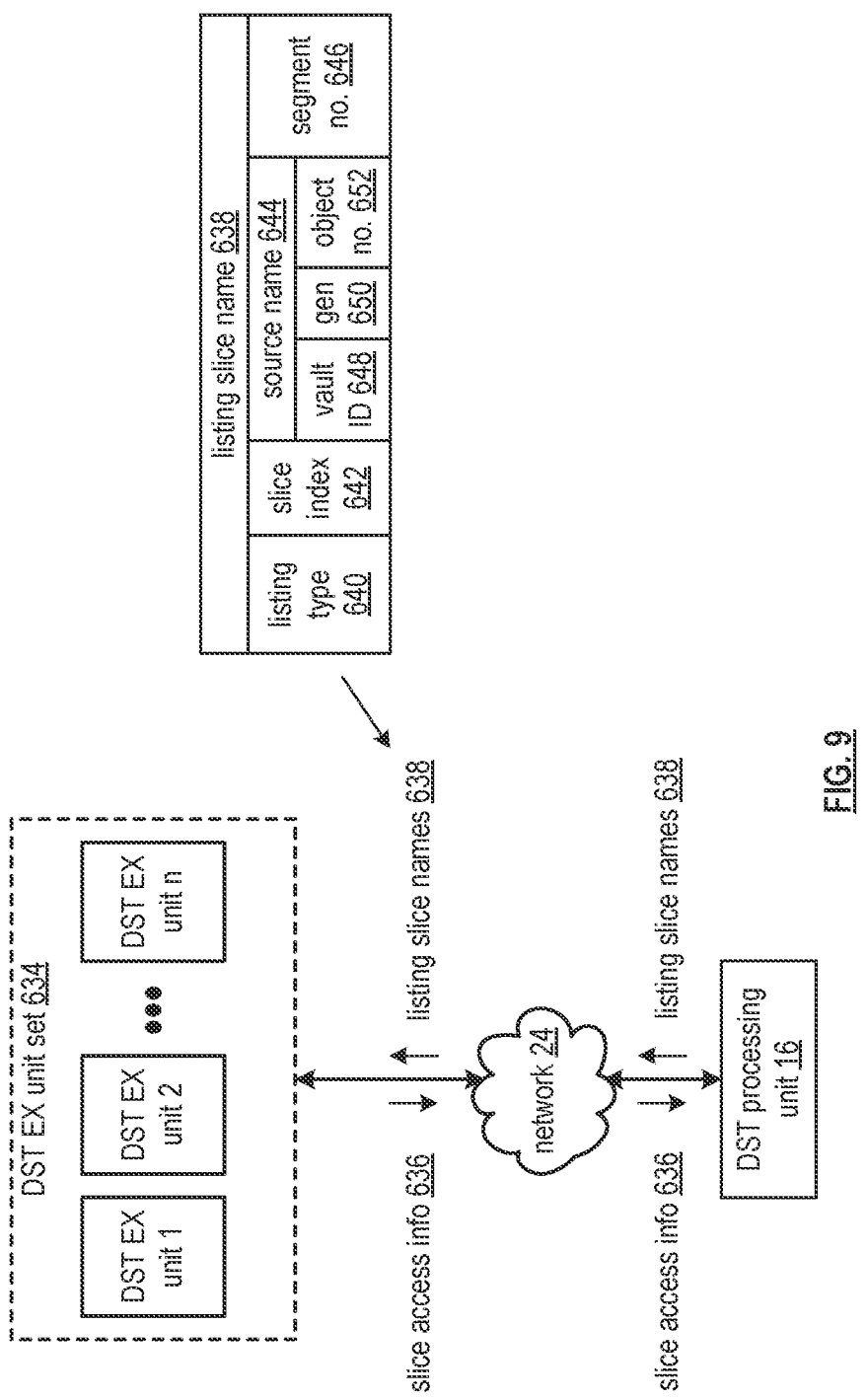
FIG. 9 is a schematic block diagram of another embodiment of a dispersed storage network (DSN) in accordance with the present invention.

FIG. 9 is a schematic block diagram of another embodiment of a dispersed storage network (DSN) that includes a distributed storage and task (DST) execution (EX) unit set 634, the network 24 of FIG. 1, and the DST processing unit 16 (computing device) of FIG. 1. The DST execution unit set 634 includes a set of DST execution units 1-n. Each DST execution unit may be implemented utilizing the storage unit 36 of FIG. 1.

The DSN functions to establish efficient access to stored encoded data slices within the DST execution unit set 634. In an example of operation of the establishing of the efficient access, the DST processing unit 16 identifies a subset of encoded data slices stored in the DST execution unit set for enhanced access. The enhanced access includes one or more of enhanced retrieval times and enhanced access to a list of the slices. The identifying includes at least one of interpreting a request, receiving a command to delete the subset of encoded data slices, receiving a command to migrate the subset of encoded data slices, receiving an indication that the subset of encoded data slices is associated with data for distributed computing tasks, or identifying a fast data retrieval requirement.

Having identified the subset of encoded data slices, the DST processing unit 16 determines a listing type corresponding to the enhanced access. The determining may be based on one or more of performing a lookup, receiving an indicator, or interpreting system registry information. The listing types may include one or more of a delete intention, a migration intention, a distributed computing task execution intention, a foster slice utilization intention, or a fast slice retrieval requirement. Such listing types may be subsequently utilized by a DST execution unit two move an associated encoded data slice into a storage medium associated with the listing type to enable future desired access and/or listing capabilities. For example, the encoded data slice shall be moved into a separate storage bin instead of sharing a storage bin with other encoded data slices. As another example, a slice name of the encoded data slice shall be listed in a separate list that is quickly searchable by one or more agents accessing at least one of the encoded data slice and the list. As another example, when performing an operation that may require a lot of time, such as deleting all segments for some large object, a requester may copy the list of objects/segments to be deleted into a new listing type with a value reserved for containing these "delete intention" objects. This prevents the content to be deleted from being permanently orphaned should the requester crash or otherwise fail to complete the delete operation. Clean-up agents can rapidly list through all "delete intention" objects by crafting a listing request designed to cover the range of only the objects that have the right value in the "listing type" field in the slice name range.

Having determined the listing type, the DST processing unit 16 generates listings slice names 638 for the subset of encoded data slices based on the listing type and slice names associated with the subset of encoded data slices. For example, the DST processing unit 16 generates a listing type entry for a listing type field of a listings slice name based on the determined listing type and populates other fields of the slice name utilizing entries from corresponding other fields of the slice names of the subset of encoded data slices. Each listing slice name 638 includes a plurality of fields, where the plurality of fields includes one or more of a listing type 640, a slice index 642 (e.g., corresponding to unique DST execution units of the set of DST execution units), a source name 644, or a segment number 646 (e.g., of a plurality of segments of a data object). The source name section 644 includes one or more of a vault identifier field 648, a generation field 650 (e.g., of multiple generations of a common vault), or an object number field 652 (e.g., a unique number associated with each unique data object for storage in the DST execution unit set).

Having generated the listings slice names 638 for the subset of encoded data slices, the DST processing unit 16 sends, via the network 24, the listing slice names 638 to the DST execution unit set 634. For example, the DST processing unit 16 transmits, via the network 24, the listings slice names 638 to the DST execution unit set 634. As another example, the DST processing unit 16 generates a set of slice access requests (e.g., write slice request, read slice requests) that includes the listings slice names and sends the set of slice access requests to the DST execution unit set.

Each DST execution unit receiving some of the listings slice names updates storage and/or listing of at least some of the subset of encoded data slices associated with the DST execution unit based on the listing type. For example, the DST execution unit stores encoded data slices in a fashion commensurate with high-speed access when the listing type indicates that fast data access retrieval is required. As another example, the DST execution unit stores slice names with the listing type in a slice name list associated with enhanced access when the listing type indicates enhanced access to the list of slices.

Having performed the update, each DST execution unit issues, via the network 24, slice access information 636 to the DST processing unit 16 in response to one or more slice access requests in accordance with the listing type for at least some of the subset of encoded data slices. For example, the DST execution unit retrieves encoded data slices from a high-speed retrieval memory, generates the slice access information 636 to include the retrieved encoded data slice, and sends, via the network 24, the slice access information 636 to the DST processing unit 16 when the listing type indicates fast data retrieval. As another example, the DST execution unit initiates deletion of stored encoded data slices stored within a corresponding access request, generates slice access information 636 including an indication of the deleted encoded data slices, and sends, via the network 24, a slice access information to the DST processing unit 16. The DST processing unit 16 receives slice access information 636 from at least some of the DST execution units for further processing (e.g., status of a data object deletion process before and/or after interruption of deletion of corresponding encoded data slices).

FIG. 9A is a flowchart illustrating an example of establishing efficient access to stored encoded data slices. The method includes step 660 where a processing module (e.g., of a distributed storage and task (DST) processing unit) identifies a subset of encoded data slices stored in a set of storage units for enhanced access. The identifying includes at least one of interpreting a request, determining to delete slices, determining to migrate slices, determining to process a distributed computing task, or indicating to enable fast data retrieval.

The method continues at step 662 where the processing module determines a listing type corresponding to the enhanced access. The determining includes one or more of performing a lookup, receiving an indicator, or interpreting system registry information. The method continues at step

664 where the processing module generates listing slice names for the subset of encoded data slices based on the listing type. For example, the processing module generates a listing type and for a listing type field of the listing slice names based on the listing type. For instance, the processing module performs a lookup for a listing entry (e.g., opcode, a bit pattern, an indicator value, etc.) based on the listing type.

The method continues at step 666 where the processing module sends the listing slice names to the set of storage units. For example, the processing module sends the listing slice names as part of a listing slice name message to the set of storage units. As another example, the processing module issues slice access requests to the set of storage units, where the slice access requests include the listing slice names.

The method continues at step 668 where each storage unit updates storage and/or listing of at least some of the subset of encoded data slices associated with the storage unit based on the listing type. The updating includes updating one or more of encoded data slice storage and a slice name list storage in accordance with the listing type.

The method continues at step 670 where each storage unit issues slice access information to a requesting entity (e.g., to the processing module) in response to one or more slice access requests in accordance with the listing type for at least some of the subset of encoded data slices. For example, the storage unit receives the slice access request, processes the slice access requests in accordance with the listing type associated with encoded data slice of the request, generates the slice access information based on the processing, and sends the slice access information to the requesting entity.

The method continues at step 672 where the requesting entity receives slice access information from at least some of the set of storage units. For example, the processing module receives the slice access information and processes the received slice access information in accordance with a corresponding slice access request.

The method described above in conjunction with the processing module can alternatively be performed by other modules of the dispersed storage network or by other computing devices. In addition, at least one memory section (e.g., a non-transitory computer readable storage medium) that stores operational instructions can, when executed by one or more processing modules of one or more computing devices of the dispersed storage network (DSN), cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/ or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution in a storage network comprises:

identifying, by a processing module of the storage network, a subset of encoded data slices stored in a set of storage units for a storage network operation, wherein the storage network operation increases a time requirement relative to one or more other storage network operations;

determining a listing type corresponding to the subset of encoded data slices;

generating, by the processing module, listing identifiers for the subset of encoded data slices based on the listing type;

sending, by the processing module, the listing identifiers to the set of storage units; and issuing, by the processing module, slice access information to a requesting entity based on the listing type for at least some of the subset of encoded data slices, wherein the requesting entity receives the slice access information from at least some of the set of storage units.

2. The method of claim 1, wherein the determining a listing type includes interpreting a listing type field of listing slice names based on the listing type.

3. The method of claim 1 wherein the generating listing identifiers includes performing a lookup for a listing entry based on the listing type.

4. The method of claim 3, wherein the listing entry is any of: an opcode, a bit pattern, or an indicator value.

5. The method of claim 1, wherein the sending the listing identifiers to the set of storage units includes sending the listing identifiers as part of a listing slice name message to the set of storage units.

6. The method of claim 1, wherein the sending the listing identifiers to the set of storage units includes issuing the one or more slice access requests to the set of storage units, where the one or more slice access requests include the listing identifiers.

7. The method of claim 1, further comprising:
updating includes updating one or more of encoded data slice storage or a slice name list storage based on the listing type.

8. The method of claim 1, wherein the issuing includes the storage unit receiving the one or more slice access requests, processing the one or more slice access requests based on the listing type associated with an encoded data slice of the one or more slice access requests, generating the slice access information based on the processing, and sending the slice access information to the requesting entity.

9. The method of claim 1, wherein the requesting entity receiving the slice access information includes receiving the slice access information and processing the received slice access information based on a corresponding one of the one or more slice access requests.

10. A computing device of a group of computing devices of a storage network, the computing device comprises:
an interface;
a local memory; and
a processing module operably coupled to the interface and the local memory, wherein the processing module functions to:
identify a subset of encoded data slices stored in a set of storage units in accordance to a storage network operation, wherein the storage network operation increases a time requirement relative to one or more other storage network operations;
determine a listing type corresponding to the subset of encoded data slices;
generate listing identifiers for the subset of encoded data slices based on the listing type;
send the listing identifiers to the set of storage units;
issue, for the storage unit, slice access information to a requesting entity based on the listing type for at least some of the subset of encoded data slices; and
wherein the requesting entity receives the slice access information from at least some of the set of storage units.

11. The computing device of claim 10, wherein the generate listing identifiers includes a listing type field of listing slice names based on the listing type.

12. The computing device of claim 10, wherein the generate listing identifiers includes performing a lookup for a listing entry based on the listing type.

13. The computing device of claim 10, further comprising: updating one or more of encoded data slice storage or a slice name list storage based on the listing type.

14. The computing device of claim 10, wherein the issue slice access information includes the storage unit receiving the one or more slice access requests, processing the one or more slice access requests based on the listing type associated with an encoded data slice of the one or more slice access requests, generating the slice access information based on the processing, and sending the slice access information to the requesting entity.

15. The computing device of claim 10, wherein the requesting entity receives the slice access information includes receiving the slice access information and processing the received slice access information based on a corresponding one of the one or more slice access requests.

16. A system comprises:
an interface;
a local memory; and
a processing module operably coupled to the interface and the local memory, wherein the processing module functions to:
identify a subset of encoded data slices stored in a set of storage units identify a subset of encoded data slices stored in a set of storage units in accordance to a storage network operation, wherein the storage network operation increases a time requirement relative to one or more other storage network operations;
determine a listing type corresponding to the subset of encoded data slices;
generate listing identifiers for the subset of encoded data slices based on the listing type;
send the listing identifiers to the set of storage units;
issue, for the storage unit, slice access information to a requesting entity based on the listing type for at least some of the subset of encoded data slices; and
wherein the requesting entity receives the slice access information from at least some of the set of storage units.

17. The system of claim 16, wherein the generate listing identifiers includes any of: a listing type field of listing slice names based on the listing type or performing a lookup for a listing entry based on the listing type.

18. The system of claim 16, wherein the generate listing identifiers includes a listing type field of listing slice names based on the listing type.

19. The system of claim 16, further comprising: updating one or more of encoded data slice storage or a slice name list storage based on the listing type.

20. The system of claim 16, wherein the issue slice access information includes the storage unit receiving the one or more slice access requests, processing the one or more slice access requests based on the listing type associated with an encoded data slice of the one or more slice access requests, generating the slice access information based on the processing, and sending the slice access information to the requesting entity.

\* \* \* \* \*